United States Patent [19]
Light

[11] 3,762,785
[45] Oct. 2, 1973

[54] WHEEL SUPPORTED TURNTABLE FOR TRAILERS AND THE LIKE

[76] Inventor: Cordell C. Light, Rt. 1, Box 265, Amarillo, Tex. 79106

[22] Filed: Sept. 8, 1971

[21] Appl. No.: 178,618

[52] U.S. Cl. .............................................. 308/230
[51] Int. Cl. ........................................... F16c 33/74
[58] Field of Search.................... 308/221, 223, 225, 308/230

[56] References Cited
UNITED STATES PATENTS

| 915,478 | 3/1909 | Roy..................................... 308/221 |
| 1,234,033 | 7/1917 | Iseman................................ 308/225 |
| 3,384,428 | 5/1968 | Hodge................................. 308/135 |

FOREIGN PATENTS OR APPLICATIONS

| 1,060,991 | 11/1953 | France.............................. 308/223 |

*Primary Examiner*—Charles J. Myhre
*Assistant Examiner*—Frank Susko
*Attorney*—Clarence A. O'Brien et al.

[57] ABSTRACT

A load supporting and handling turntable expressly but not necessarily designed and adapted for use between the leading wheel-equipped load supporting and steering end of a trailer and the wheel-equipped truck or carriage with which the trailer is operatively connected. It comprises a first circular plate fixedly connectible to a component part of the carriage, a second plate aligned with and above the first plate, said second plate being provided with an elongated adapter plate and being centrally connected by a spindle with the axial portions of the first and second plates. Concentric annular grooves in the opposed inward surfaces of the plates accommodate anti-friction ball bearings. These ball bearings and the opposed surfaces of the plates are protected by an appropriately mounted O-ring. In addition the outer peripheral edges of the two plates are encompassed by a loose fitting but appropriately mounted band which constitutes a dust guard. This band in conjunction with the O-ring provides effective protection for the vulnerable surfaces between the first and second plates.

5 Claims, 4 Drawing Figures

PATENTED OCT 2 1973 3,762,785

Cordell C. Light
INVENTOR.

BY Clarence A. O'Brien
and Harvey B. Jacobson
Attorneys

WHEEL SUPPORTED TURNTABLE FOR TRAILERS AND THE LIKE

This invention relates to certain new and useful improvements in a turntable which while feasible and practical for load supporting and handling use in many and varying fields of endeavor, is expressly designed and adapted for reliable and satisfactory use between a wheel equipped load supporting and steering truck or carriage and the forward end of a wheel supported trailer.

More specifically, the invention pertains to a turntable characterized by a first or bottom plate which is welded atop an underlying wheel supported frame member, a second or top plate which is like and lined up with the bottom plate and which supports an adapter plate carrying a headed bolt which extends down through axial openings provided therefor and provides a plate assembling spindle.

Persons conversant with the field of invention herein under advisement are aware that turntables are of many and varied styles and types and are capable of being satisfactorily used in varying fields of endeavor. For background purposes and as exemplary of the general state of the art to which the invention relates, reference can be made to a patent to Richard B. Iseman directed to a turntable, namely, U.S. Pat. No. 1,234,033. Another and broadly analogous trailer-type turntable is shown in U.S. Pat. No. 3,536,214 granted to Robert P. Sorg et al.

Briefly and pertaining primarily to the load supporting and managing turntable it has to do with a first circular plate provided with an axial spindle accommodating hole, a complemental second circular plate which is structurally similar to, complemental with and aligned with an in fact disposed in a plane slightly above and parallel with the first plate and which also has a centralized spindle accommodating hole. The apertured portions of the plates provide a pocket which contains hub means, that is anti-friction hub means which is interposed between the coacting axial portions of the two plates and in fact is registrable with the spindle holes. An elongated rigid bar-like adapter plate is superimposed upon and welded atop the top or second plate and is provided with overhanging end portions which are connectible with a portion of the trailer. This adapter plate is centrally provided with a depending headed bolt which extends down through the spindle holes and constitutes the plate assembling and turning spindle. Ball bearings are fitted in grooves between the opposed faces of the plates and these ball bearings are protected by an O-ring. The O-ring can be located at the outer peripheral portions of the plates or inwardly of the peripheral portions. In addition to the O-ring, a dust band surrounds the outer peripheral or marginal edges of the first and second plates and functions as a satisfactory dust guard.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
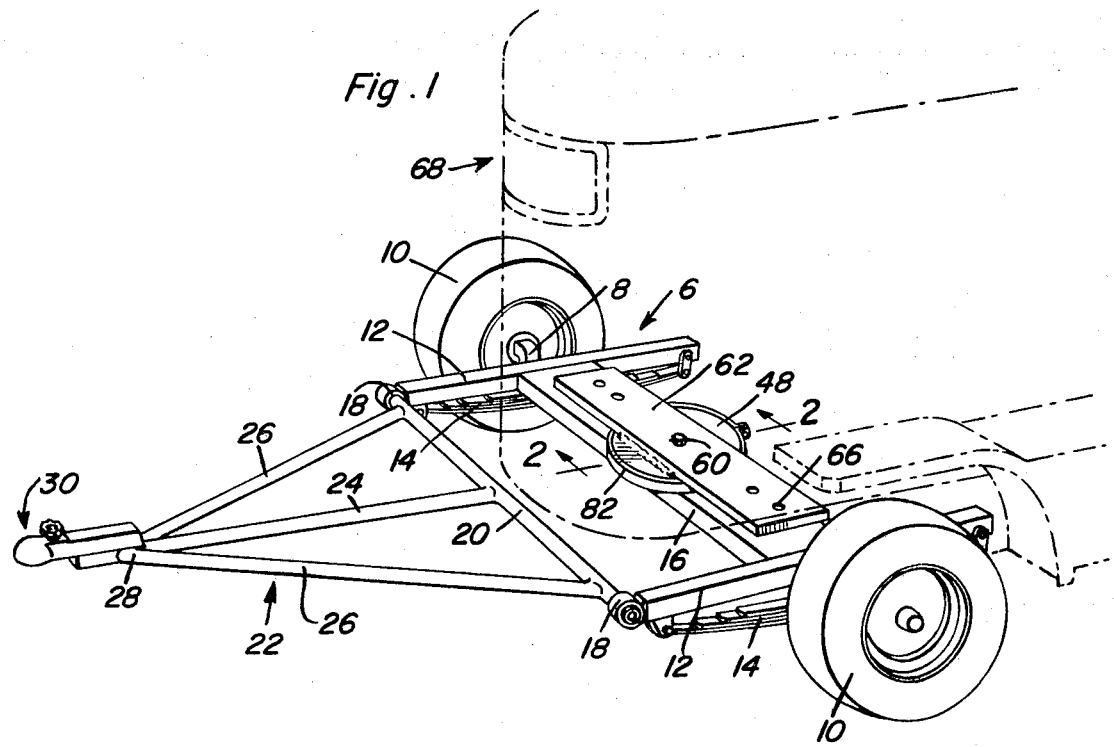
FIG. 1 is a view in perspective showing a wheel supported truck-type carriage equipped with the improved turn-table and suggesting, in phantom lines, how the forward or leading end of a trailer is capable of being operatively connected for supporting and steering purposes with the adapter plate of the turntable.
Figure 2:
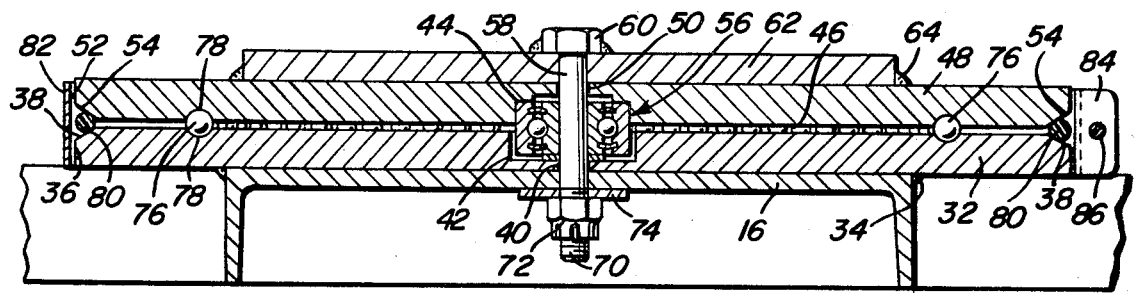
FIG. 2 is an enlarged detailed sectional view with parts in elevation taken approximately on the plane of the section line 2—2 of FIG. 1 looking in the direction of the indicating arrows.
Figure 3:
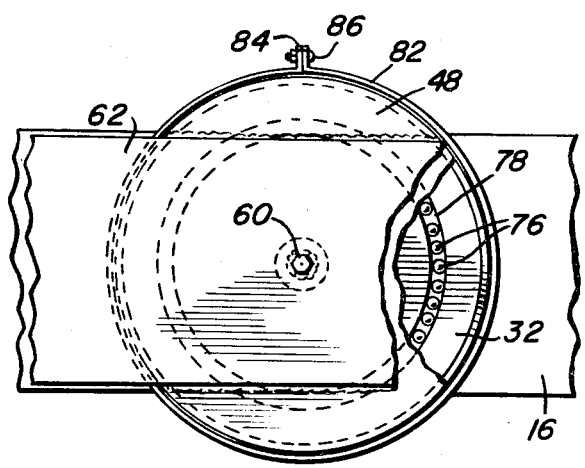
FIG. 3 is a top plan view with portions broken away and showing significant component parts of the overall invention.

Attention is directed first to FIGS. 1 to 3 inclusive. With reference in particular to FIG. 1, the aforementioned truck-type wheel supported carriage is denoted, generally stated, by the numeral 6 (FIG. 1). This carriage comprises an axle 8 provided on its respective ends with suitably mounted ground engaging wheels 10. The frame structure comprises a pair of horizontal spaced parallel coplanar end frame members 12 which have their end portions coupled to corresponding end portions of coplanar spaced parallel leaf springs 14. The median portions of the leaf springs (not detailed) are shackled to end portions of the axle inwardly of the wheels 10. In addition to the end frame members there is a centralized coplanar channel-shaped cross-brace which is denoted by the numeral 16. The transverse end portions of this brace are rigidly joined to the inward median portions of the respective frame members 12 as is brought out in FIG. 1. The forward end portions of the frame members are provided with appropriate bearings 18 which accommodate the ends of an axle-like member 20 of the tongue means 22. This means comprises the tongue proper 24 which has its rearward end joined to the axle-like mounting member 20. This tongue is provided on opposite sides thereof with stabilizing members 26 which converge as at 28 and are operatively connected with an appropriately constructed hitch 30.

With reference now to the turntable and with particular reference to FIG. 2, it will be seen that the solid flat-faced disc-like lower plate constitutes a first plate and is designated by the numeral 32. This plate is seated atop the web of the channel-shaped cross-brace 16 and is welded or otherwise fixedly joined thereto as at 34. The overhanging outer marginal or peripheral edge is denoted at 36 and a portion of the edge is provided with a suitably angled chamfer or bevel 38. The axial central portion of this plate is provided with a spindle hole 40 and, in addition, with a pocket-like recess 42. This recess 42 is aligned with a similar pocket-like recess 44 formed in the underneath side 46 of the second disc-like plate 48. The plate 48 likewise has a central spindle hole 50. The outer margin or peripheral edge is denoted at 52 (FIG. 2) and this edge also has a chamfer or bevel as at 54. These bevels converge toward each other and define a channel which serves a purpose to be hereinafter set forth. The anti-friction ball bearing hub means is denoted at 56 (FIG. 2) and is operatively fitted into the pockets 42 and 44 and cooperates with the spindle holes 40 and 50. This hub and the spindle holes serve to accommodate the shank of a headed bolt which functions as the spindle. The bolt proper is denoted at 58 and the head at 60. This bolt is fixed to and carried by the central portion of an elongated rectangular adapter plate 62 which is superimposed atop the second disc-like plate 48 and is welded thereto as at 64. The end portions of the adapter plate overhang, that is projected beyond the peripheral surfaces of the plates 32 and 48 and are provided with bolt holes or equivalent fastening means 66 which can be employed in practice to accommodate and operatively mount the forward end portion of the wheel-supported trailer 68. It will be noted that the threaded end portion of the spindle or bolt extends not only down through the several plates but also through the web portion of the cross-brace 62 as at 70 to accommodate an assembling and retaining nut 72 and an associated washer 74.

The opposed planar faces of the two plates 32 and 48 are slightly spaced apart by an annular arrangement of anti-friction ball bearings 76 which are seated in aligned grooves 78 provided therefor.

It is desired to minimize as far as practical the accumulation of dust, dirt and extraneous matter between the plates 32 and 48. To this end, it will be noted that the channel at the outer flush ends of the plates is provided with an O-ring 80 which provides a dust preventing seal. In addition a band 82 is provided and this band encircles the peripheral surfaces 36 and 52 and provides an appropriate dust guard. It should be noted that the band is approximately as wide as the thickness of the two plates and is preferably a split band, the split end portions being provided with outstanding ears 84 connected together by bolt and nut means 86. Thus with the O-ring serving as a seal or gasket and with the band serving as a dust collar or guard the vulnerable anti-friction balls 76 and the ball-equipped hub means 56 is satisfactorily shielded and protected.

Figure 4:
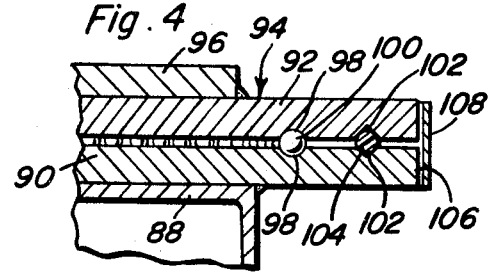
FIG. 4 is a fragmentary sectional view showing a modification wherein the O-ring is mounted in channels provided therefor inwardly of the outer peripheral edges of the first and second plates.

In the modification appearing in FIG. 4, the parts are basically the same as already described. Briefly this view shows the channel-shaped cross-brace 88, the first or bottom plate 90 and the companion second or upper plate 92. These plates together provide the principal parts of the turntable 94. In this arrangement the adapter bar or plate is denoted at 96 and is fixed atop the plate 92. Here again the opposed faces of the plates are provided with grooves 98 which are lined up to accommodate the anti-friction balls 100. The V-shaped channels in this arrangement are denoted at 102 and are lined up to accommodate the O-ring 104. Therefore, instead of having the O-ring on the outer marginal portion as shown in FIG. 2, the O-ring is set inwardly of the outer marginal edges 106 which edges in this arrangement are also covered by a suitably wide loose-fitting and appropriately retained dust guard or band 108. This band corresponds in construction and purpose to the aforementioned dust guard or band 82.

It will be understood from the disclosure that novelty is predicated on the combination and association of the unique turntable with the cross-brace 16 of a wheel-supported trailer-supporting and steering truck or carriage and, in addition, upon the load supporting turntable as such characterized by the several plates 32, 48 and 62 assembled and joined by a spindle and provided with anti-friction ball means sandwiched between the plates 32 and 48 and particularly on the utilization of the dust minimizing O-rings and the encircling but unattached dust band or guard 82 or 108 as the case may be.

It is believed that a careful consideration of the views of the drawing in conjunction with the description of the details and the invention as claimed will enable the reader to obtain a clear and comprehensive understanding of the purposes and features and advantages of the turntable. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A load supporting and handling turntable comprising: a first circular plate provided at a centralized axial locale with a spindle accommodating hole, a second circular plate structurally similar, complemental to, aligned with and disposed in a plane above and oriented with said first plate and also having a centralized spindle accommodating hole like and aligned with said first hole, anti-friction hub means interposed between coacting axial portions of said first and second plates and cooperatively registrable with said spindle holes, spindle means cooperable with said spindle holes and said hub means, said plates having spaced parallel confronting inner planar surfaces having endless registering grooves, anti-friction ball bearings seated and operatively confined in their respective cooperable grooves, and means outwardly of and concentric with said ball bearing grooves and serving to protectively seal and dustproof the grooves and the ball bearings which are functionally confined in said grooves, said sealing and dustproofing means comprising an O-ring constituting a protective gasket and retentively seated in a channel means provided therefor, said plates having outer peripheral edges which are endlessly smooth and flush, and a band encompassing said edges, covering an existing gap between the plates and constituting a dust guard.

2. The turntable defined in and according to claim 1, and wherein said band is free of positive mechanical connection with said plates, said band being split and having free lateral ends which are separably fastened together.

3. A load supporting and handling turntable comprising: a first circular plate provided at a centralized axial locale with a spindle accommodating hole, a second circular plate structurally similar, complemental to, aligned with and disposed in a plane above and oriented with said first plate and also having a centralized spindle accommodating hole like and aligned with said first hole, anti-friction hub means interposed between coacting axial portions of said first and second plates and cooperatively registrable with said spindle holes, spindle means cooperable with said spindle holes and said hub means, said plates having spaced parallel confronting inner planar surfaces having endless registering grooves, anti-friction ball bearings seated and operatively confined in their respective cooperable grooves, and means outwardly of and concentric with said ball bearing grooves and serving to protectively seal and dustproof the grooves and the ball bearings which are functionally confined in said grooves, and in combination, an elongated load-bearing adapter plate superimposed upon and fixed atop said second plate, said spindle being carried by and depending from the central portion of said adapter plate and said adapter plate having terminal end portions overhanging and projecting beyond the peripheral edges of said first and second plates and having means for connection with the load which is adapted to be seated on said adapter plate.

4. The turntable defined in and according to claim 1, and wherein said channel means is formed in coacting portions of said outer peripheral edges, said band being free of positive mechanical connection with said plates and bridging and covering said channel means and the O-ring which is seated therein.

5. The turntable defined in and according to claim 1 and wherein said channel means is provided in said confronting planar surfaces and is concentric to and situated outwardly of said grooves and radially inward of the outer peripheral edges of said plates.

* * * * *